United States Patent
Ogasawara

(10) Patent No.: US 7,151,595 B2
(45) Date of Patent: Dec. 19, 2006

(54) FOCUS ERROR DETECTING DEVICE AND OPTICAL PICKUP DEVICE HAVING THE SAME

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 495 days.

(21) Appl. No.: 10/679,500

(22) Filed: Oct. 7, 2003

(65) Prior Publication Data

US 2004/0135062 A1    Jul. 15, 2004

(30) Foreign Application Priority Data

Oct. 10, 2002    (JP)    ............................. 2002-296971

(51) Int. Cl.
*G01B 9/00*    (2006.01)

(52) U.S. Cl. ..................................... 356/125

(58) Field of Classification Search ................ 356/125, 356/237.1, 237.2, 237.3, 237.4, 237.5, 239.1, 356/239.3
See application file for complete search history.

(56) References Cited

U.S. PATENT DOCUMENTS

2002/0003755 A1 *    1/2002    Fujita et al. .............. 369/44.23
2003/0035350 A1 *    2/2003    Ogasawara et al. ....... 369/44.23

* cited by examiner

*Primary Examiner*—Layla Lauchman
*Assistant Examiner*—Tri Ton
(74) *Attorney, Agent, or Firm*—McGinn IP Law Group PLLC

(57) ABSTRACT

A focus error detecting device for an optical pickup having an aberration correcting lens group includes a diffraction optical element having an outer diameter which is smaller than a diameter of the light beam after aberration correction, and selectively diffracting light passing through an annular portion with an optical axis as a center in a plane perpendicular to the optical axis of the light beam; and a photodetector which detects the light diffracted by the diffraction optical element. The annular portion includes a portion in which residual ray aberration after aberration correction by the lens group is the smallest.

5 Claims, 16 Drawing Sheets

FIG.12
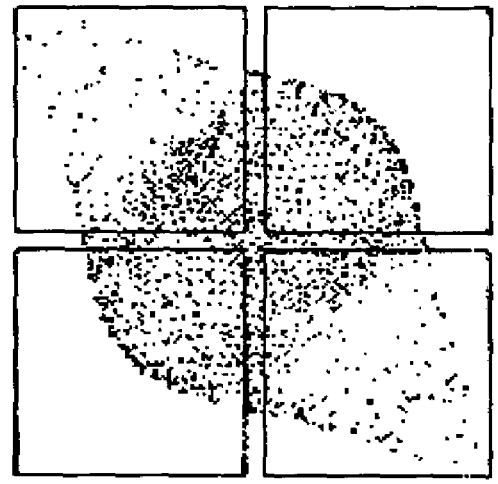
TC=120μm
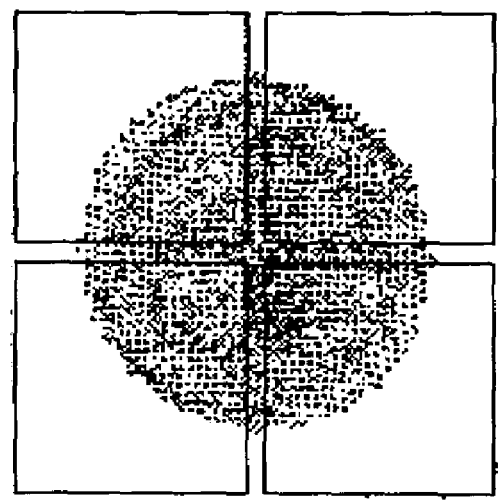
TC=100μm

FIG.13
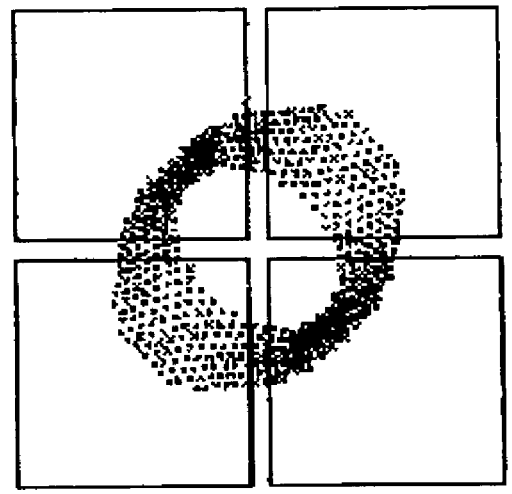
TC=120μm
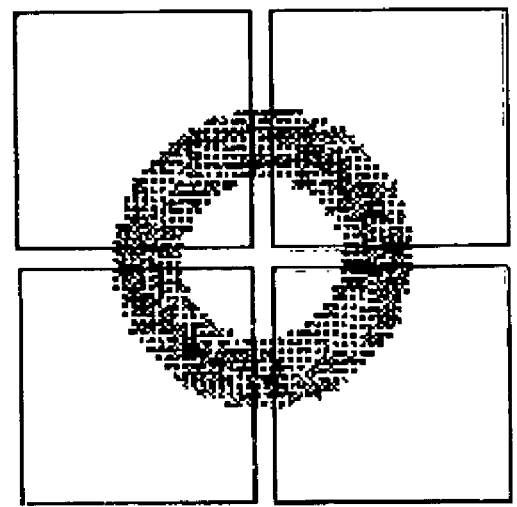
TC=100μm

FOCUS ERROR DETECTING DEVICE AND OPTICAL PICKUP DEVICE HAVING THE SAME

BACKGROUND OF THE INVENTION

1. Field of the Invention

The present invention relates to a focus error detecting device for detecting focus error of a light beam and an optical pickup device having the focus error detecting device.

2. Description of the Related Art

As information recording medium with which information recording or information reproduction is optically performed, an optical disc such as a CD (Compact disc) and a DVD (Digital Versatile Disc) are known. Further, the development of a larger capacity recording medium is pursued, for example, a Blu-ray disc and an apparatus therefor using a blue-violet semiconductor laser since the laser has a shorter wavelength, and thus has an advantage of decreasing a beam spot thereof.

The research and development of a higher precision optical pickup device is proceeding in accordance with the progress of the optical disc as described above. In such an optical pickup device, a light beam such as a laser beam is applied to an optical disc when recording or reproduction is performed. It is important to focus the light beam on a position to be recorded or reproduced with precision while correcting aberration produced in the reflected light from the optical disc. For example, the aberration changes during recording or reproduction of the optical disc, since a cover layer thickness of an optical disc generally has in-plane distribution.

Some conventional aberration correcting devices for correcting such aberration use a collimator lens for collimating a light beam or a beam expander for changing a beam diameter of the light beam. For example, there is one disclosed in Japanese Patent Application Kokai No. 10-106012. These aberration correcting devices are for correcting spherical aberration of the light beam, which is produced by the optical disc, by moving the collimator lens or the beam expander along an optical axis of the light beam. Alternatively, study on a light beam shaping optical element for shaping a form of a light beam emitted from a light source etc., or study on a semiconductor laser for causing an aspect ratio of the emitted light beam to approach one etc. is proceeding. When such light beam as described above is used, it becomes easier to provide an optical pickup device for correcting spherical aberration by moving the collimator lens along the optical axis.

However, there is a problem that high order spherical aberration remains uncorrected when correcting the spherical aberration by using a group of lenses. Therefore, distortion of a spot is produced on a detecting element by residual ray aberration even when the spherical aberration is corrected on the disc surface. As a result, focus servo does not act on the best image point despite that the spherical aberration is corrected to result in occurrence of defocusing. Accordingly, there causes a problem in recording and reproduction operation due to the occurrence of defocusing.

SUMMARY OF THE INVENTION

The present invention is achieved in light of the above described problems, and the problems can be cited as an example that the invention is to solve. The object of the present invention is to provide a high performance focus error detecting device with extremely little defocusing used for an optical pickup device which has an aberration correction mechanism using a collimator type optical element or the like, and such an optical pickup device.

According to the present invention, there is provided a focus error detecting device for an optical pickup including a lens group for correcting aberration of a light beam, which comprises a diffraction optical element having an outer diameter which is smaller than a diameter of the light beam after aberration correction is performed thereon by the lens group, and selectively diffracting light passing through an annular portion with an optical axis as a center in a plane perpendicular to the optical axis of the light beam; and a photodetector which detects the light diffracted by the diffraction optical element, wherein the annular portion includes a portion in which residual ray aberration after aberration correction by the lens group is the smallest.

According to another aspect of the present invention, there is provided an optical pickup device for focusing a light beam on a recording medium and detecting the light beam reflected from the recording medium, the device comprises an aberration correcting unit including a lens group and correcting aberration by moving the lens group along an optical axis of the light beam; a diffraction optical element having an outer diameter that is smaller than a diameter of the light beam after the aberration correction is performed thereon, and selectively diffracting light passing through an annular portion with the optical axis as a center in a plane perpendicular to the optical axis of the light beam; and a photodetector for detecting the light diffracted by the diffraction optical element, wherein the annular portion includes a portion in which residual ray aberration after aberration correction by the lens group is the smallest.

According to another aspect of the present invention, there is provided a focus error detecting device for an optical pickup including a collimator-type optical element for correcting aberration of a light beam, the device comprises a diffraction optical element having an outer diameter which is smaller than a diameter of the light beam after aberration correction is performed by the collimator-type optical element, and selectively diffracting light passing through an annular portion with an optical axis as a center in a plane perpendicular to the optical axis of the light beam; and a photodetector which detects the light diffracted by the diffraction optical element, wherein the annular portion includes a portion in which residual ray aberration after aberration correction by the collimator-type optical element is the smallest.

According to another aspect of the present invention, there is provided an optical pickup device for focusing a light beam on a recording medium and detecting the light beam reflected from the recording medium, the device comprises an aberration correcting unit including a collimator-type optical element for correcting aberration of the light beam; a diffraction optical element having an outer diameter that is smaller than a diameter of the light beam after the aberration correction is performed, and selectively diffracting light passing through an annular portion with the optical axis as a center in a plane perpendicular to the optical axis of the light beam; and a photodetector for detecting the light diffracted by the diffraction optical element, wherein the annular portion includes a portion in which residual ray aberration after aberration correction by the collimator-type optical element is the smallest.

BRIEF DESCRIPTION OF THE DRAWINGS

FIG. 12 is a diagram showing distribution of light on the detector when there is no layer thickness error in the cover layer of the optical disc (TC=100 μm) and when there is a layer thickness error (TC=120 μm), FIG. 13 is a diagram showing distribution of light on the secondary detector when the hologram element is used.

DETAILED DISCRIPTION OF THE INVENTION

Figure 1:
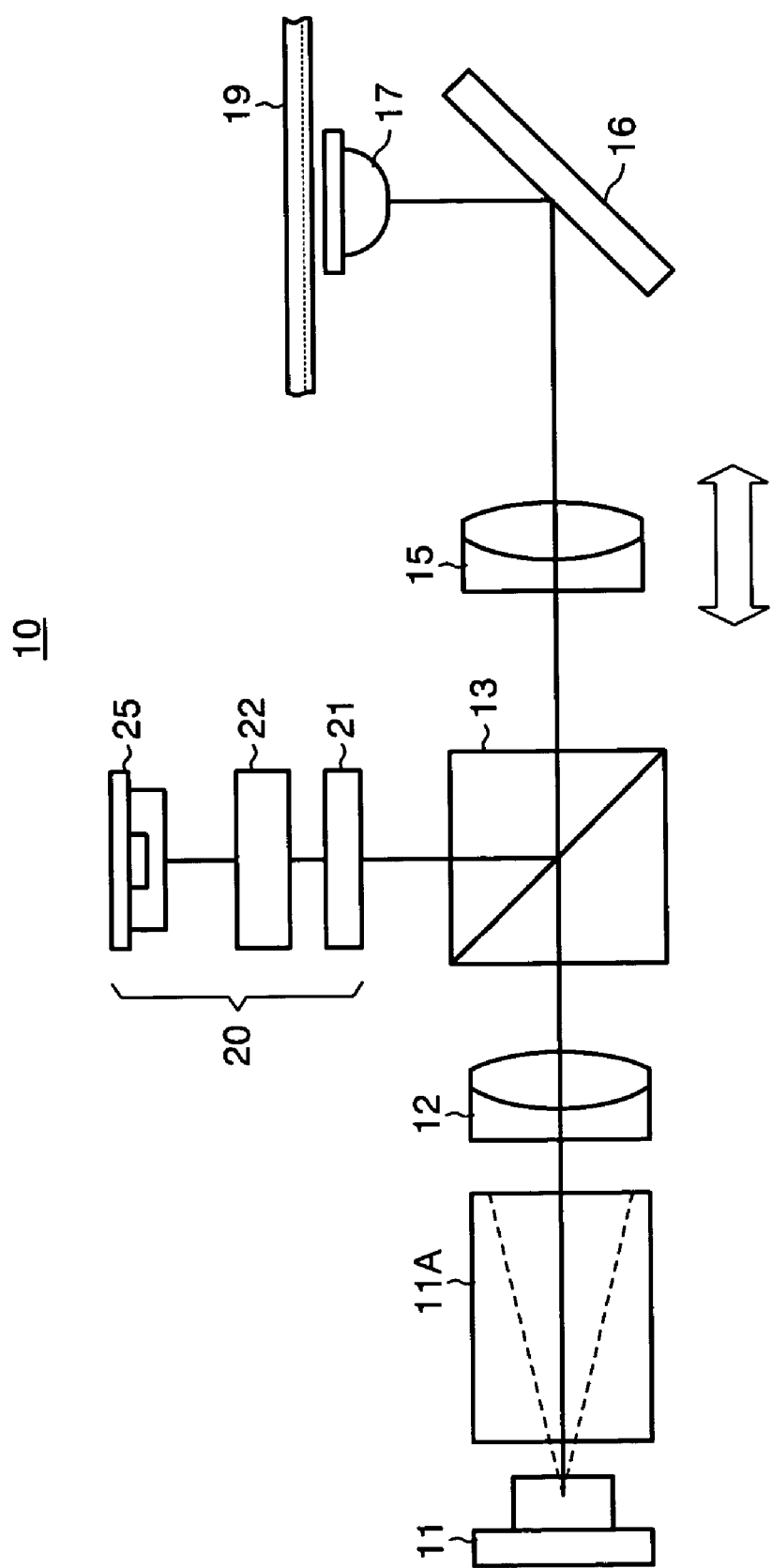
FIG. 1 is a block diagram showing a configuration of an optical pickup device having a focus error detecting device according to an embodiment of the present invention.
Figure 2:
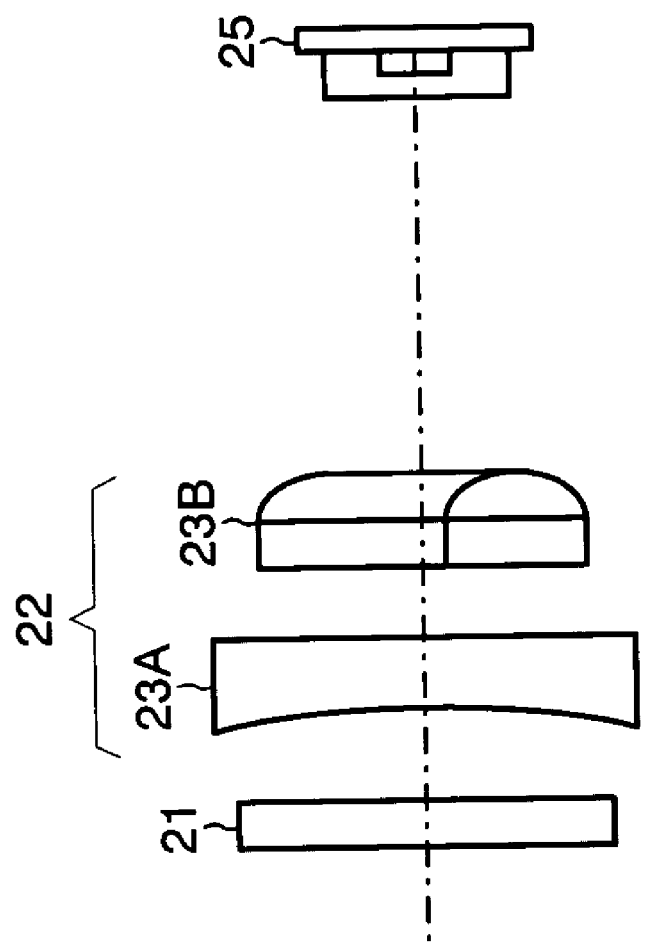
FIG. 2 is a diagram showing a configuration of a detection system.

The invention will be described in detail while referring to the drawings. Note that, in the drawings described below, substantially equivalent parts are assigned the same reference numerals.

FIG. 1 is a block diagram showing a configuration of an optical pickup device 10 having a focus error detecting device 20 that is one embodiment of the invention.

There is provided a laser beam source 11 for emitting a laser beam having a predetermined wavelength in the optical pickup device 10. The laser beam source 11 emits a laser beam having a wavelength λ=405 nanometers (nm), for example. The light beam emitted from the laser beam source 11 is shaped by a light beam shaping optical element 11A such as a light beam shaping prism, so that an aspect ratio of the light beam may approach a circular form. The shaped light beam is made into a collimated light beam by a collimator lens 12. The light beam passes through a beam splitter 13 and a collimator lens 15 to be reflected by a mirror 16 and then, applied to an optical disc 19 via an objective lens 17. The applied light beam is reflected by the optical disc 19. The reflected light passes through the collimator lens 15 and is reflected by the beam splitter 13 to be detected by a detection system 20.

The collimator lens 15 is mounted to an actuator (not shown), and adapted to be movable along an optical axis of the light beam. The collimator lens 15 is moved under the control of a controller (not shown), and spherical aberration of the light beam, which is generated by the optical disc 19, is corrected. That is, the collimator lens 15 is an optical element of so-called infinite focus type, however, the lens effects a change in wavefront (phase) of the transmitted light by the movement thereof. Thereby, an incident angle of incident luminous flux of the objective lens is changed to generate spherical aberration in the objective lens. The generated spherical aberration is used to cancel spherical aberration generated by an error in a cover thickness of the disc. However, by this method, the spherical aberration cannot be completely cancelled, and high-order spherical aberration will remain. As an optical element for correcting aberration, not limited to the collimator lens, but also an optical element that can exhibit an effect of aberration correction by the above described effect can be used. Here, such optical element is referred to as a collimator type optical element or just a collimator optical element. Further, an arrangement is shown in FIG. 1 in which the collimator optical element is disposed between the objective lens 17 and the detection system 20, i.e., in an optical path through which the reflected light from the optical disc 19 reaches the detection system 20. However, the arrangement of the invention is not limited to the particular arrangement. For example, the collimator optical element may be disposed between the laser beam source 11 and the beam splitter 13. In this case, the collimator optical element also exhibits an effect of spherical aberration correction by the similar action as described above.

The detection system 20 includes a hologram element 21, an optical lens unit 22 consisted of a multi-lens, and a photodetector 25. The optical lens unit 22 has a concave lens 23A and a cylindrical lens 23B.

Figure 3:
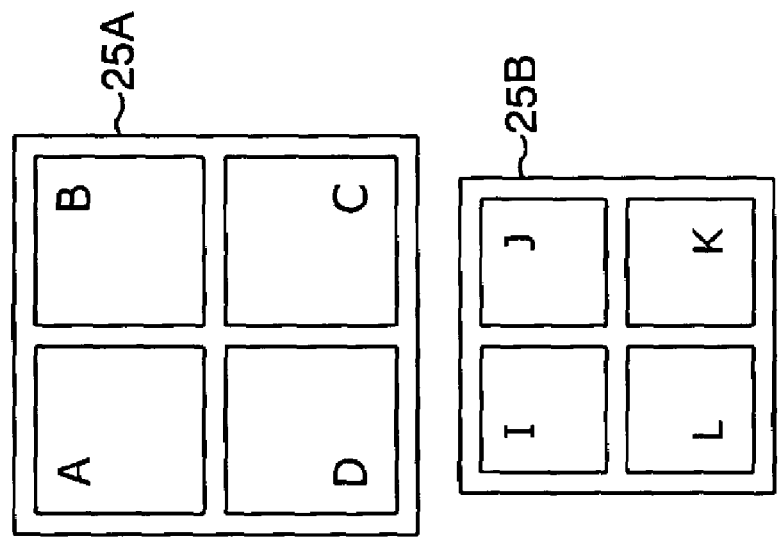
FIG. 3 is a plan view showing an arrangement of a primary detector and a secondary detector.

FIG. 3 shows a detector arrangement of the photodetector 25. Note that, as an example, description will be made for a case when the astigmatic method is used for focus error detection. The photodetector 25 includes a primary detector 25A for detecting zero order diffraction light and a secondary detector 25B for detecting first order diffraction light from the optical disc 19. The primary detector 25A is constituted as a four-part split detector consisting of detection areas or portions A, B, C, and D, and the secondary detector 25B is constituted also as a four-part split detector consisting of photodetection portions I, J, K, and L. The secondary detector 25B is dedicated to use for focus error detection.

Figure 4:
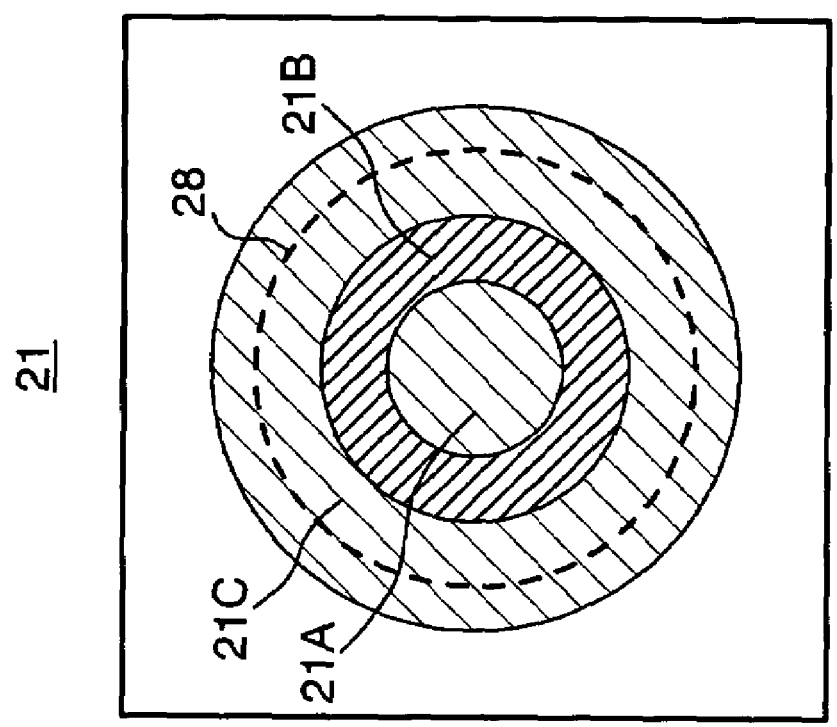
FIG. 4 is a plan view showing a grating configuration of a hologram element.

FIG. 4 is a plan view showing a grating configuration of the hologram element 21. The hologram element 21 is formed as a concentric circular or annular grating. More specifically, the hologram element 21 is constituted by a circular grating area 21A and annular grating areas 21B and 21C. The hologram element 21 is arranged coaxially with the light beam. Note that, in the drawing, a beam diameter 28 of the light beam is shown by a dashed line. That is, an outer diameter of the annular portion 21B is formed so as to be smaller than the light beam diameter. Further, the annular portion is corresponding to the high-order spherical aberration that remains after correcting spherical aberration by the collimator optical element. Ray aberration that remains after spherical aberration correction is performed and a method for defining the annular portion will be described in detail below.

Figure 5:
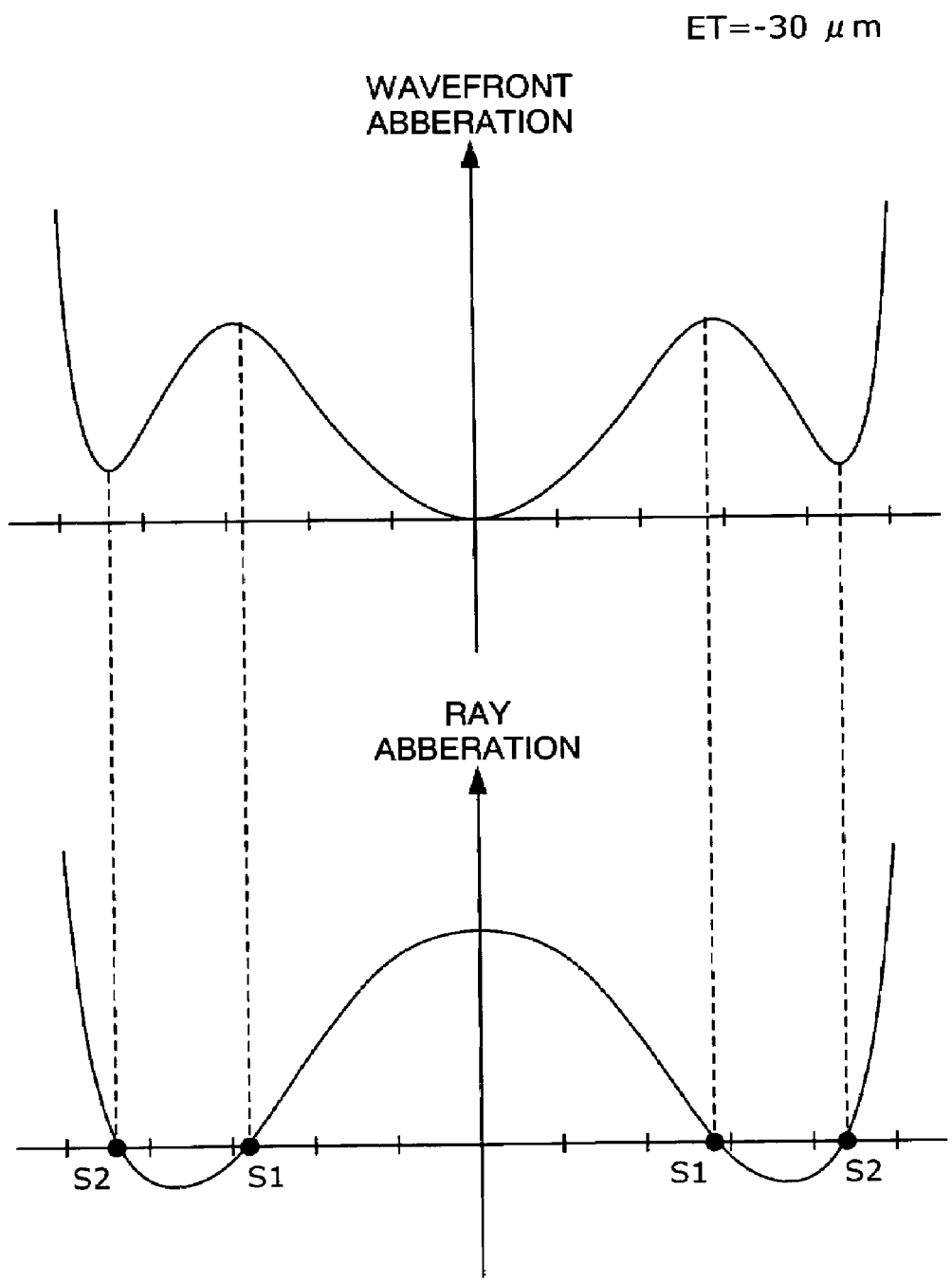
FIG. 5 is a diagram showing residual spherical aberration and residual ray aberration in the case where an error in a cover layer thickness is −30 μm.
Figure 6:
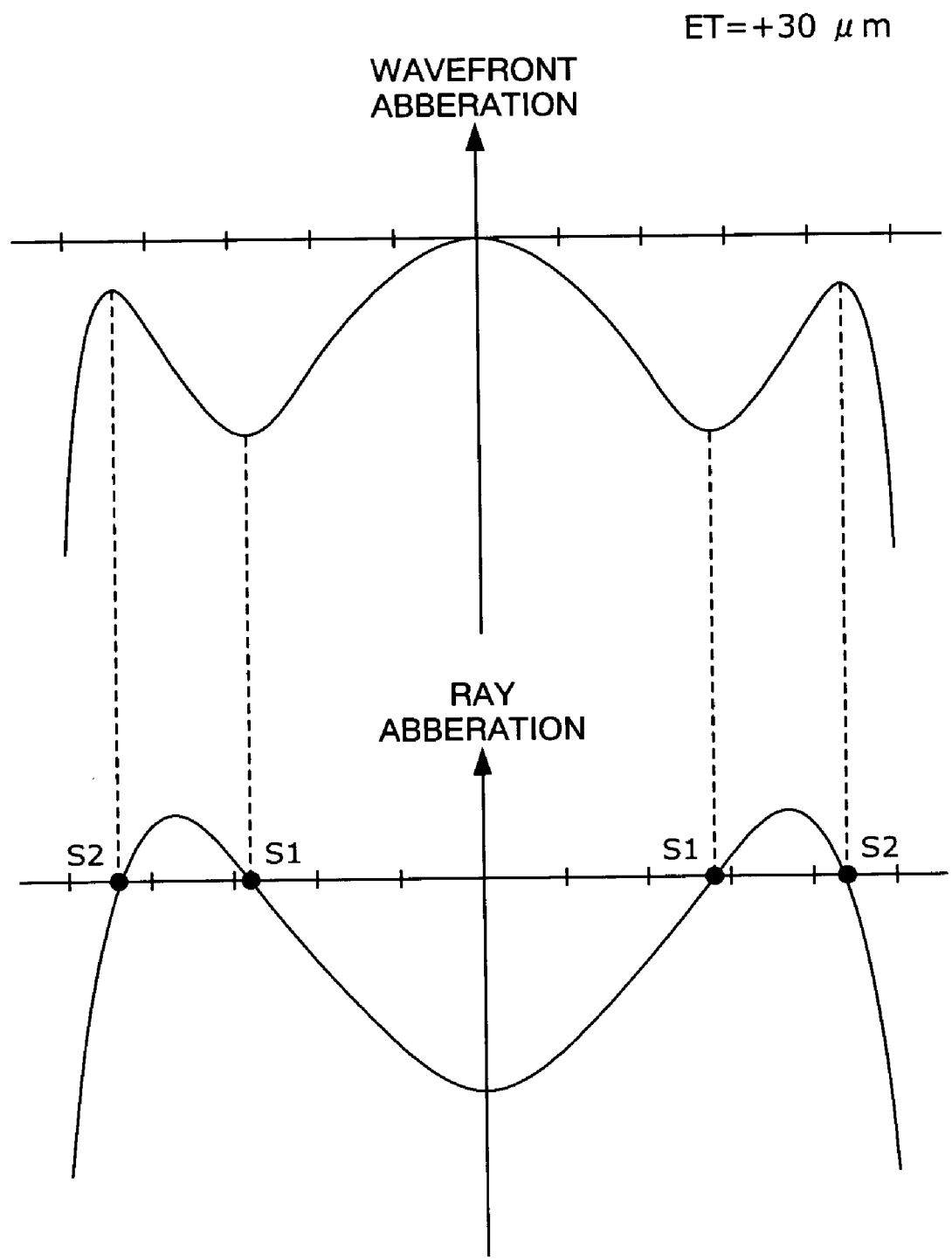
FIG. 6 is a diagram showing residual spherical aberration and residual ray aberration in the case where the error in the cover layer thickness is +30 μm.

After the spherical aberration due to the error in the cover layer thickness is corrected by optical elements such as a collimator lens or abeam expander (hereinafter, generically referred to as an aberration correction lens or a lens group), residual spherical aberration is generated due to characteristics of the lens group. FIG. 5 shows residual spherical aberration (upper drawing in FIG. 5) that is wavefront aberration that remains when correcting spherical aberration by the beam expander or the collimator lens, and residual ray aberration (derivation of wavefront aberration) (lower drawing in FIG. 5) when the error in the cover layer thickness is −30 micrometers (μm). Note that, sectional profiles of residual aberrations in a direction of the beam diameter in a plane perpendicular to the optical axis are shown. Additionally, for ease of description, the residual aberrations are shown in an enlarged scale. The residual spherical aberration takes the form of wavefront in which the high-order components mainly predominate, and which has plural inflection points. Further, FIG. 6 shows residual spherical aberration (upper drawing in FIG. 6) and residual ray aberration (lower drawing in FIG. 6) when the error in the cover layer thickness is +30 μm. Similarly to that shown in FIG. 6, the residual spherical aberration takes the form of wavefront having inflection points of the residual spherical aberration in a plane perpendicular to the optical axis.

Furthermore, in the ray aberration, there is a plurality of fixed points of the ray corresponding to the inflection points. More specifically, as shown in FIGS. 5 and 6, when there are two inflection points in the sectional profile, the fixed points exist corresponding to the inflection points. That is, the fixed points never move on the detectors without being influenced by the high-order spherical aberration that remains after the spherical aberration correction. Further, curves connecting the inflection points in the plane perpendicular to the optical axis take circular forms (hereinafter, referred to as S1 and S2, respectively).

The ray passing near the annular portion including the circles (S1, S2) is hardly influenced by the high-order spherical aberration that remains due to spherical aberration correction. Further, the size of the annular portion never changes according to a magnitude and polarity of the residual aberration after the objective lens and the aberration correction lens group are determined.

Figure 7:
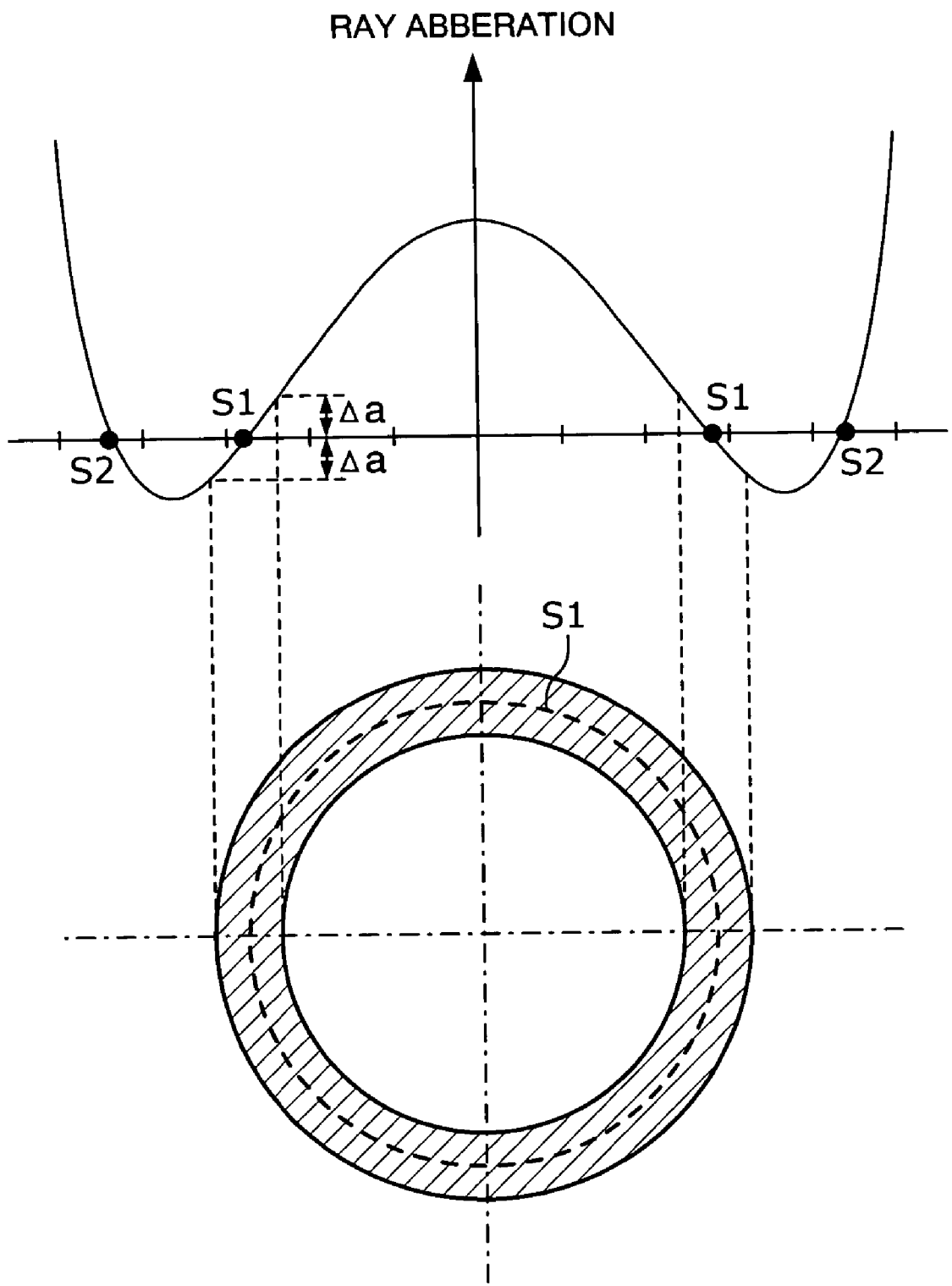
FIG. 7 is a view showing an annular portion having a predetermined width and including a circle S1.

Therefore, the annular portion may be defined so as to include one of the circles (S1, S2). For example, the annular portion may be determined so as to include the circle S1 having a predetermined width as shown in FIG. 7. Further, it is preferred that the width of the annular portion is, for example, determined so that the aberrations may be substantially cancelled out with the circle S1 as a center. For example, the width of the annular portion may be determined so as to correspond to the aberration ±Δa as shown in FIG. 7.

Figure 8:
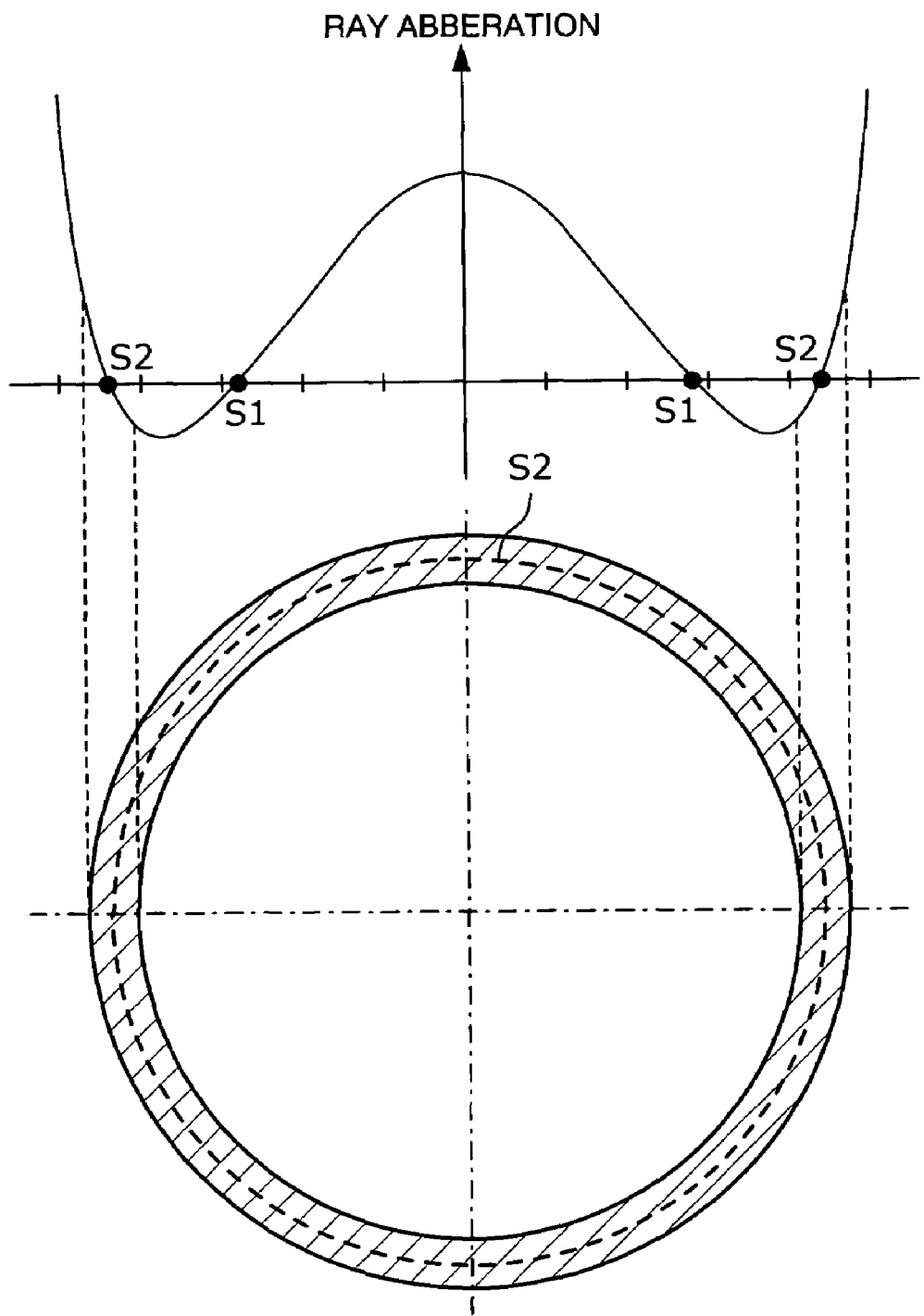
FIG. 8 is a view showing an annular portion having a predetermined width and including a circle S2.
Figure 9:
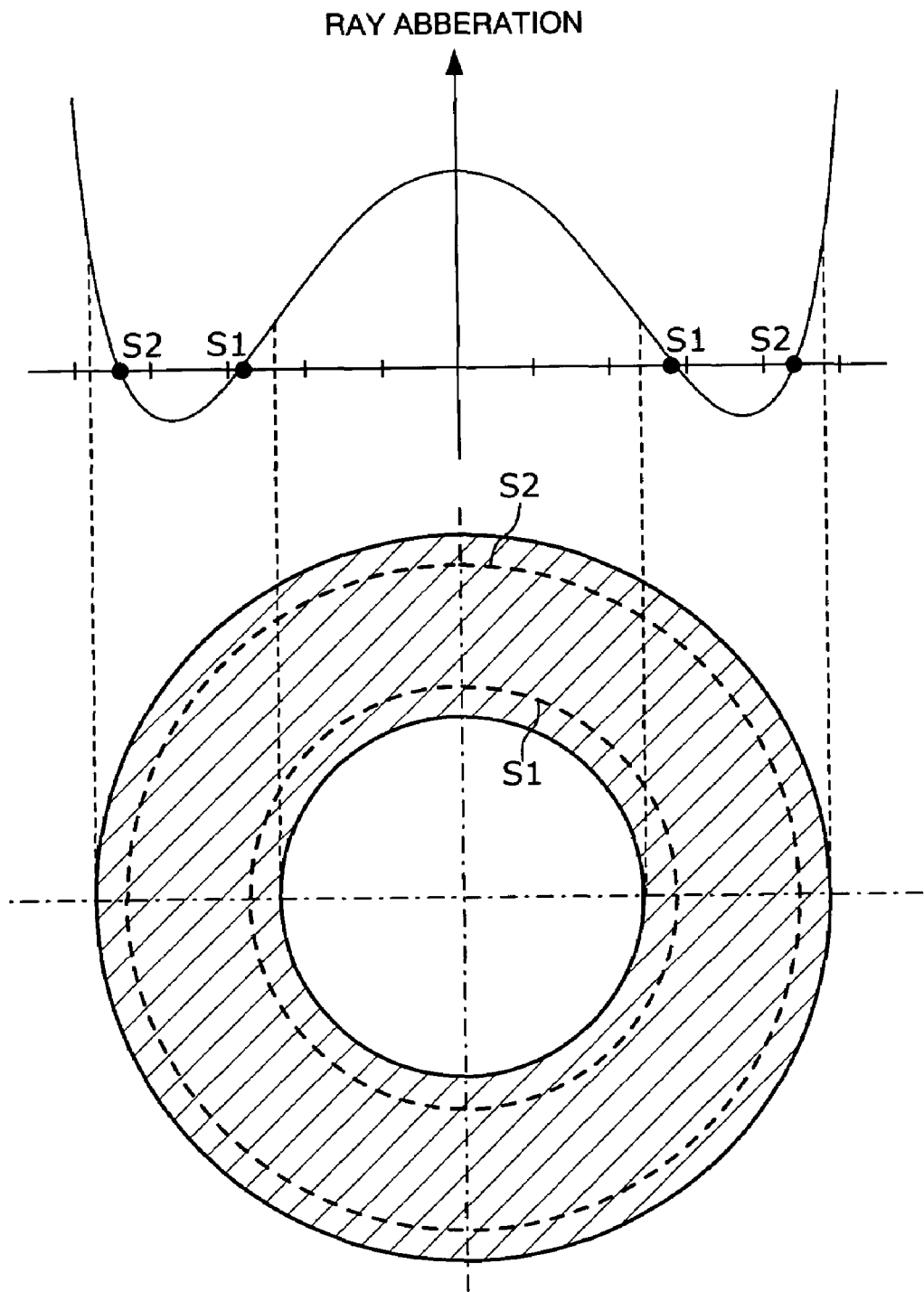
FIG. 9 is a view showing an annular portion including both of the circles S1 and S2.
Figure 10:
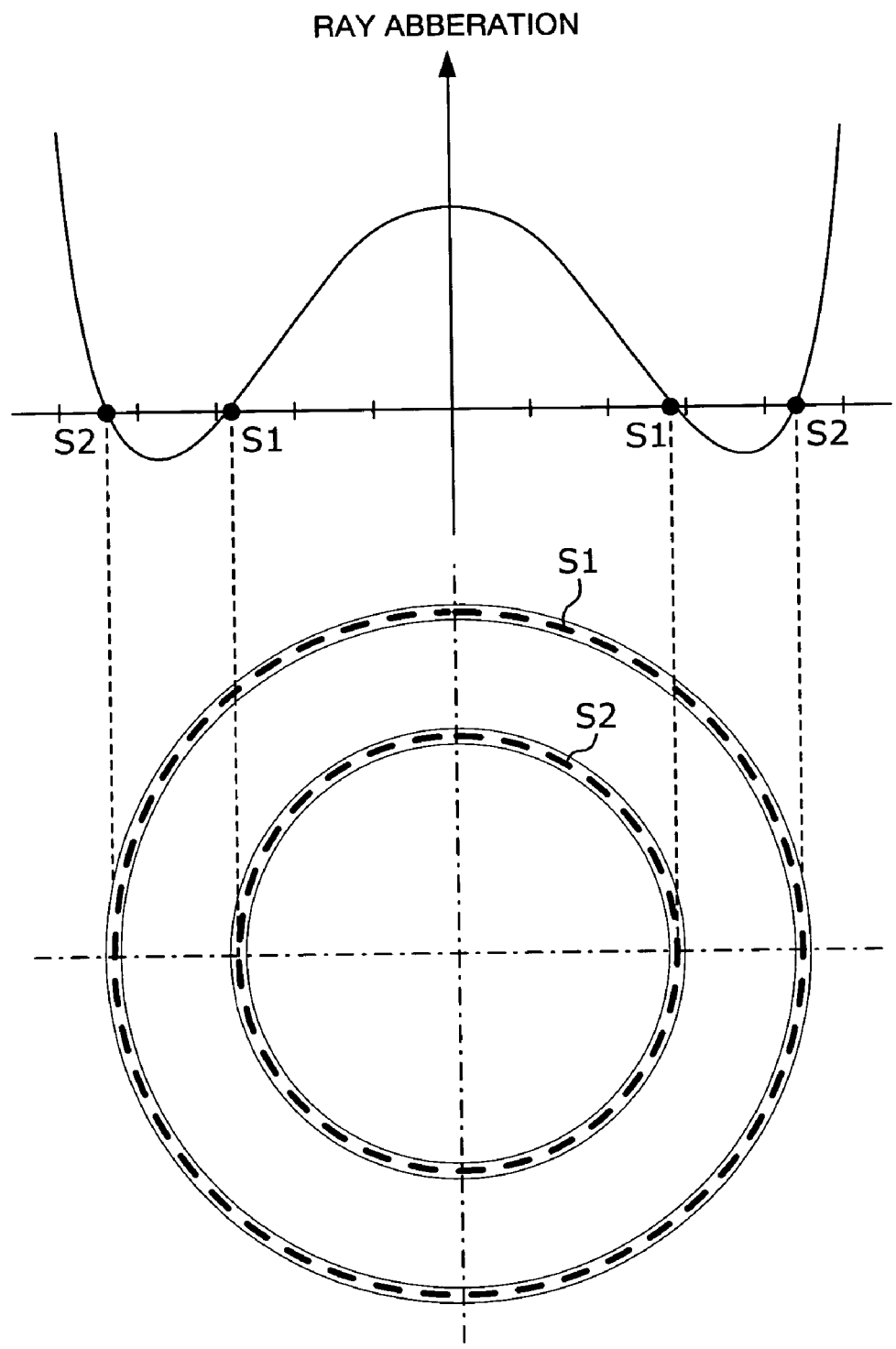
FIG. 10 is a view showing an annular portion including the circle S1 and/or the circle S2 and having a narrow width to the extent necessary for aberration correction.

Furthermore, the annular portion may be determined so as to include the circle S2 as shown in FIG. 8. Moreover, as shown in FIG. 9, the annular portion may be determined so as to include both of the circle S1 and the circle S2. Alternatively, as another method for defining the annular portion, as shown in FIG. 10, the annular portion including the circle S1 and/or the circle S2 and having an extremely narrow width may be determined. In this case, the width of the annular portion can be made narrow to an extent as long as aberration correction can be performed in accordance with photodetection sensitivity of the detectors, which will be described later.

The grating forms of the grating areas 21A and 21C are determined so that the light transmitted through the grating areas 21A and 21C of the reflected light from the optical disc 19 and entering the hologram element 21 may enter neither the primary detector 25A nor the secondary detector 25B. Further, the grating form of the grating area 21B is determined so that the light transmitted through the grating area 21B enters the photodetection portions I, J, K, and L of the secondary detector 25B.

Figure 11:
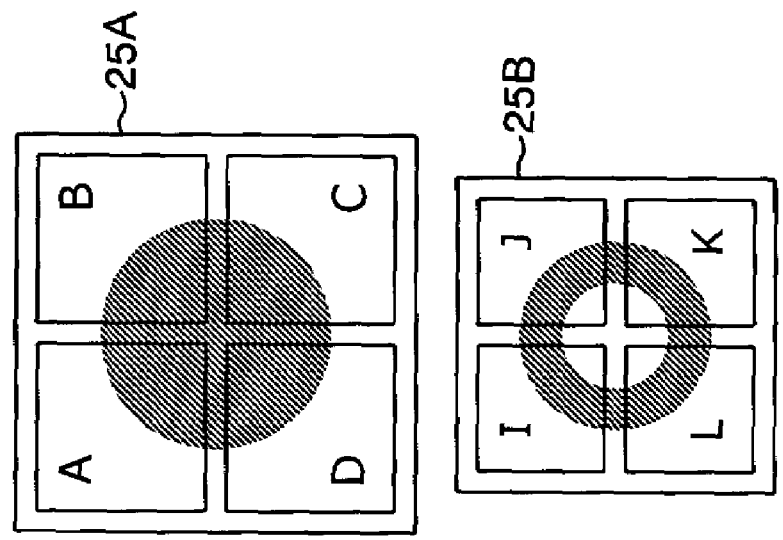
FIG. 11 is a diagram schematically showing distribution of light on the primary detector and the secondary detector when there is no thickness error in the cover layer of the optical disc.

FIG. 11 schematically shows each distribution of light on the primary detector 25A and the secondary detector 25B in the described detection system, when there is no thickness error (ET) in the cover layer of the optical disc 19. According to the grating configuration of the hologram element 21, light distribution takes a circular form in the primary detector 25A, and light distribution takes an annular form in the secondary detector 25B.

FIG. 12 shows distribution of light on the detector when there is no layer thickness error in the cover layer of the optical disc (TC=100 μm) and distribution of light when there is a layer thickness error (TC=120 μm). When there is a layer thickness error, the aberration generated due to the layer thickness error is corrected by moving the collimator lens 15 in the direction of the optical axis. More specifically, the case where the actual cover layer thickness is 120 μm and there is a layer thickness error of 20 μm is shown with reference to the case where the cover layer thickness is 100 μm. When the whole reflected beam from the optical disc 19 is used, the precision of the focus error detection is adversely affected because, for example, distorted light with a light portion extending in a diagonal direction appearing on the detector. Therefore, when the detected light of the primary detector 25A is used for the focus aberration detection, or when the detected light of the secondary detector 25B is used without using the hologram element 21, the precision of the focus error detection is degraded even when the aberration has been corrected by the collimator lens 15 (FIG. 12: TC=120 μm).

FIG. 13 shows distribution of light on the secondary detector 25B when the hologram element 21 is used. It is seen from FIG. 13 that the above described influence of the distorted light spot is greatly reduced in the light distribution in the secondary detector 25B even when the aberration has been corrected by the collimator lens 15 (TC=120 μm) for a layer thickness error in the cover layer of the optical disc, since the light beam is extracted in an annular form by the hologram element 21.

The focus error detection operation when the annular portion is extracted from the reflected light beam by using the hologram element 21 will be described in detail below as compared to the case where the focus error detection is performed by using the whole reflected light beam.

Figure 14:
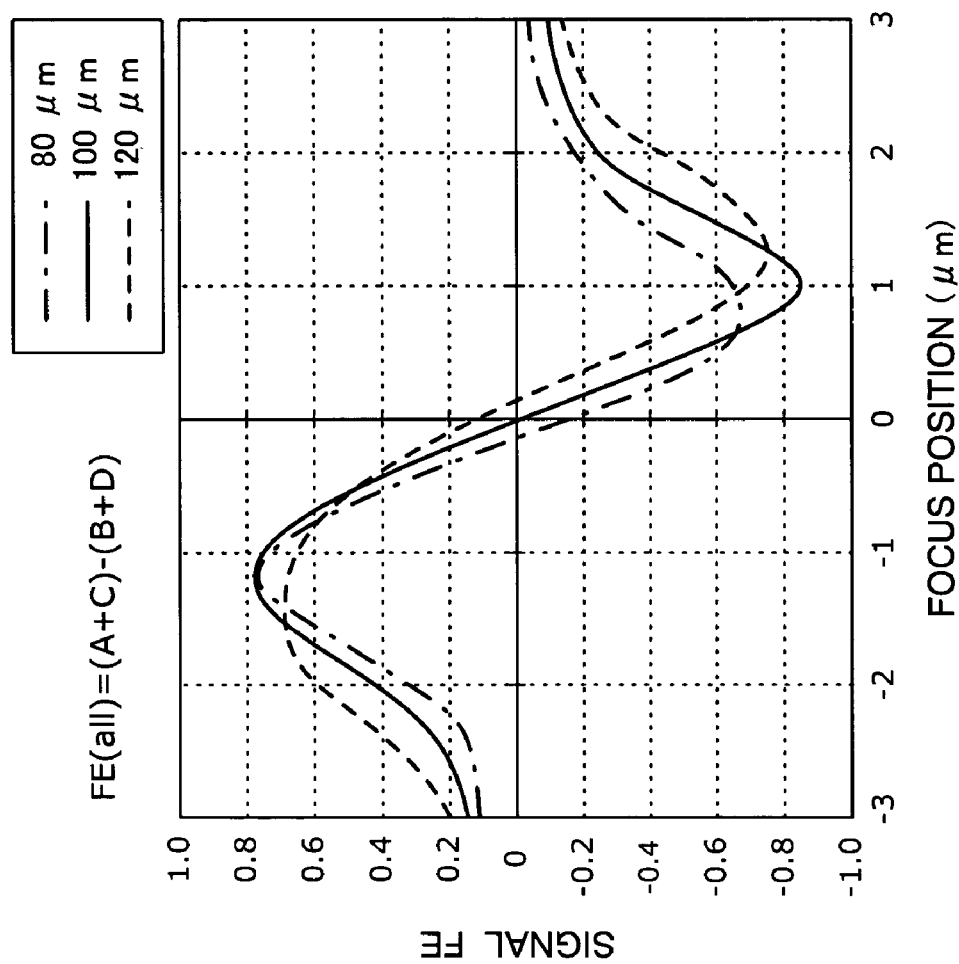
FIG. 14 is a diagram showing focus error signals FE (S-curves) when the focus error detection is performed by using a whole reflected light beam.

FIG. 14 shows the change in focus error signals FE (S-curves) when performing the focus error detection by using the whole reflected light beam, when there is no layer thickness error in the cover layer of the optical disc (TC=100 μm: shown by a solid line) and when there is a layer thickness error (TC=80 μm: shown by a chain line, TC=120 μm: shown by a dashed line). That is, FIG. 14 shows the focus error signals FE when the focus error detection is performed by using the primary detector 25A. The focus error signal is expressed as FE (all)=(A+C)−(B+D) when the signals in respective photodetection portions (A, B, C, D)

are expressed by A, B, C, and D, respectively. Further, in any case, the spherical aberration correction is optimally performed by driving the collimator lens 15.

It is seen that zero cross points where the focus error signal FE takes zero are offset depending on the layer thickness error even when the spherical aberration correction has been performed as shown in the graph. Note that, here, the focus error signals are shown with reference to the focus position when there is no layer thickness error (TC=100 μm), and thus the differences between zero cross points of the focus error signals FE indicate deviations of focus (defocusing). Therefore, the defocusing itself will change according to the aberration correction when performing aberration correction according to changes in cover layer thickness etc. upon recording or reproduction.

Figure 15:
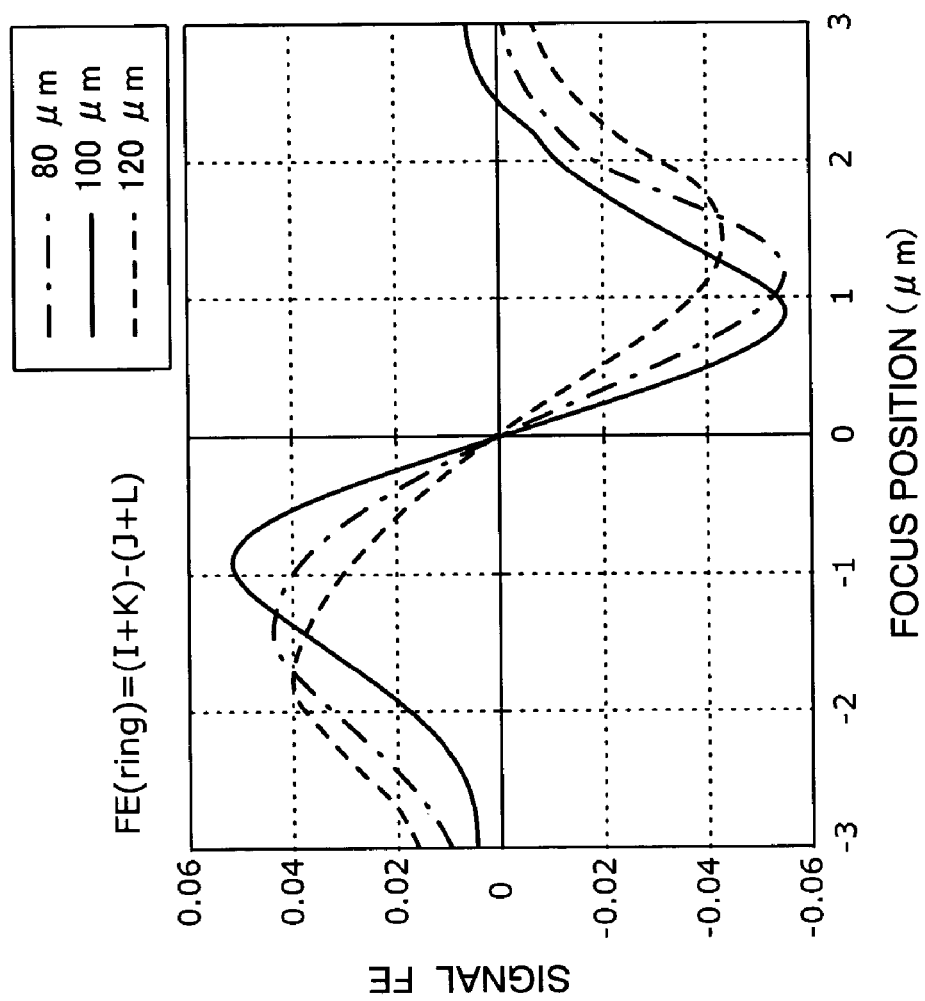
FIG. 15 is a diagram showing focus error signals FE when the focus error detection is performed by extracting an annular portion from the reflected light beam using the hologram element.

On the other hand, as shown in FIG. 15, the focus error signals FE (S-curves) are shown when the focus error detection is performed by extracting an annular portion from the reflected light beam using the hologram element 21. That is, the graph shows the focus error signals FE when the focus error detection is performed by using the secondary detector 25B. The focus error signal is expressed as FE (ring)=(I+K)−(J+L) when the signals in respective detection areas (I, J, K, L) are expressed by I, J, K, and L, respectively. Further, in any case, the spherical aberration correction is optimally performed by driving the collimator lens 15. Referring to the graph, it is seen that the zero cross points approximately match the zero cross point in the case where there is no layer thickness error (TC=100 μm) even when there is a layer thickness error (TC=80 μm or 120 μm). This means that the occurrence of defocusing is extremely suppressed.

Figure 16:
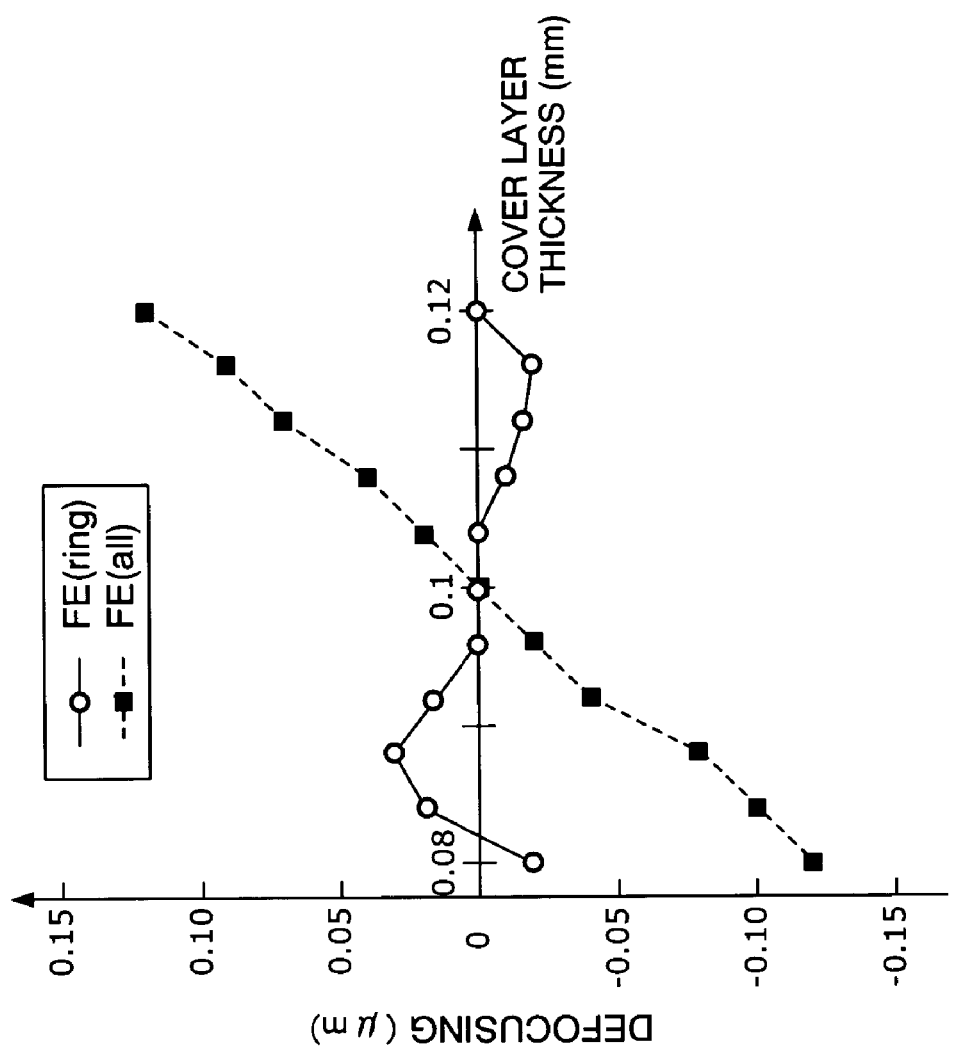
FIG. 16 is a diagram showing defocusing amounts relative to the changes in the cover layer thickness when the focus error detection is performed by using the whole reflected light beam and when the focus error detection is performed by extracting an annular portion from the reflected light beam.

FIG. 16 shows defocusing amounts relative to the changes in the cover layer thickness. It is seen that the defocusing when performing the focus error detection by extracting the annular portion from the reflected light beam (shown by a solid line in the drawing) is sufficiently reduced even when the cover layer thickness changes, as compared with the defocusing when performing the focus error detection by using the whole reflected beam (shown by a dashed line in the drawing). Therefore, the high performance focus error detection with extremely little defocusing can be performed.

Note that, in the embodiments described above, the case where the astigmatic method is used for focus error detection is described as an example, however, the invention is not limited to this. For example, the focus error detection may be performed by using a spot-size method. In this case, a three-part split detector may be used as the photodetector, for example.

Further, the optical pickup device having the light beam shaping optical element 11A is described as an example, however, the invention can be applied to an optical pickup device that does not include the light beam shaping optical element 11A.

In addition, the focus error detecting device according to the invention can be applied not only to the optical pickup device for optical discs etc., but also to various optical systems in a wide range.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2002-296971 which is hereby incorporated by reference.

What is claimed is:

1. A focus error detecting device for an optical pickup including a collimator-type optical element for correcting aberration of a light beam, the device comprising:
    a diffraction optical element having an outer diameter which is smaller than a diameter of the light beam after aberration correction is performed by said collimator-type optical element, and selectively diffracting light passing through an annular portion with an optical axis as a center in a plane perpendicular to said optical axis of said light beam; and
    a photodetector which detects the light diffracted by said diffraction optical element,
    wherein said annular portion includes a portion in which residual ray aberration after aberration correction by said collimator-type optical element is the smallest.

2. A focus error detecting device according to claim 1, wherein said diffraction optical element comprises a hologram optical element.

3. A focus error detecting device according to claim 1, further comprising a focus error signal generator which generates a focus error signal from a detection signal provided by said photodetector.

4. A focus error detecting device according to claim 3, wherein said photodetector comprises a split detector having a plurality of photodetection portions and said focus error signal generator generates said focus error signal according to an astigmatic method.

5. An optical pickup device for focusing a light beam on a recording medium and detecting the light beam reflected from said recording medium, the device comprising:
    an aberration correcting unit including a collimator-type optical element for correcting aberration of said light beam;
    a diffraction optical element having an outer diameter that is smaller than a diameter of the light beam after the aberration correction is performed, and selectively diffracting light passing through an annular portion with said optical axis as a center in a plane perpendicular to said optical axis of said light beam; and
    a photodetector for detecting the light diffracted by said diffraction optical element,
    wherein said annular portion includes a portion in which residual ray aberration after aberration correction by said collimator-type optical element is the smallest.

* * * * *